(12) United States Patent
Duesselberg et al.

(10) Patent No.: US 8,011,445 B2
(45) Date of Patent: Sep. 6, 2011

(54) PORTABLE POWER TOOL, IN PARTICULAR A DRILLING HAMMER AND/OR IMPACT HAMMER

(75) Inventors: Achim Duesselberg, Hangzhou (CN); Kurt Sieber, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 969 days.

(21) Appl. No.: 11/220,112

(22) Filed: Sep. 6, 2005

(65) Prior Publication Data

US 2006/0054333 A1 Mar. 16, 2006

(30) Foreign Application Priority Data

Sep. 15, 2004 (DE) .................. 10 2004 044 499

(51) Int. Cl.
 *B23B 45/00* (2006.01)
(52) U.S. Cl. ......... 173/170; 173/104; 173/109; 173/110
(58) Field of Classification Search ............ 173/47, 173/48, 104, 109, 110, 111, 176, 201
See application file for complete search history.

(56) References Cited

U.S. PATENT DOCUMENTS

| | | | | |
|---|---|---|---|---|
| 4,325,436 A | * | 4/1982 | Richter et al. | 173/13 |
| 4,366,869 A | * | 1/1983 | Bereiter et al. | 173/109 |
| 4,446,931 A | * | 5/1984 | Bleicher et al. | 173/48 |
| 5,320,177 A | * | 6/1994 | Shibata et al. | 173/48 |
| 6,192,996 B1 | * | 2/2001 | Sakaguchi et al. | 173/48 |

FOREIGN PATENT DOCUMENTS

| | | |
|---|---|---|
| DE | 42 16 808 | 11/1993 |
| EP | 1 157 788 A2 | 11/2001 |
| GB | 2 324 577 | 10/1998 |

* cited by examiner

*Primary Examiner* — Rinaldi I Rada
*Assistant Examiner* — Nathaniel Chukwurah
(74) *Attorney, Agent, or Firm* — Michael J. Striker

(57) ABSTRACT

A portable power tool has a housing, a rotating sleeve provided for rotatably driving a tool and a rotatably supported in the housing by at least one bearing, a driving gear-wheel installed on the rotating sleeve in a freely rotating manner and drivable by a motor, a safety clutch that couples the driving gear-wheel with the rotating sleeve in a rotation-proof manner, the safety clutch having two clutch members that are slippable, with one of the clutch members being assigned to the driving gear-wheel and the other clutch member being assigned to the rotating sleeve in both cases in a rotation-proof manner, and with a coupling sleeve providing a force against which the clutch members are slippable when a limit torque is exceeded, the bearing being seated on the rotating sleeve in an axially displaceable manner and loaded by the coupling sleeve of the safety clutch against an axial stop of the rotating sleeve.

3 Claims, 1 Drawing Sheet

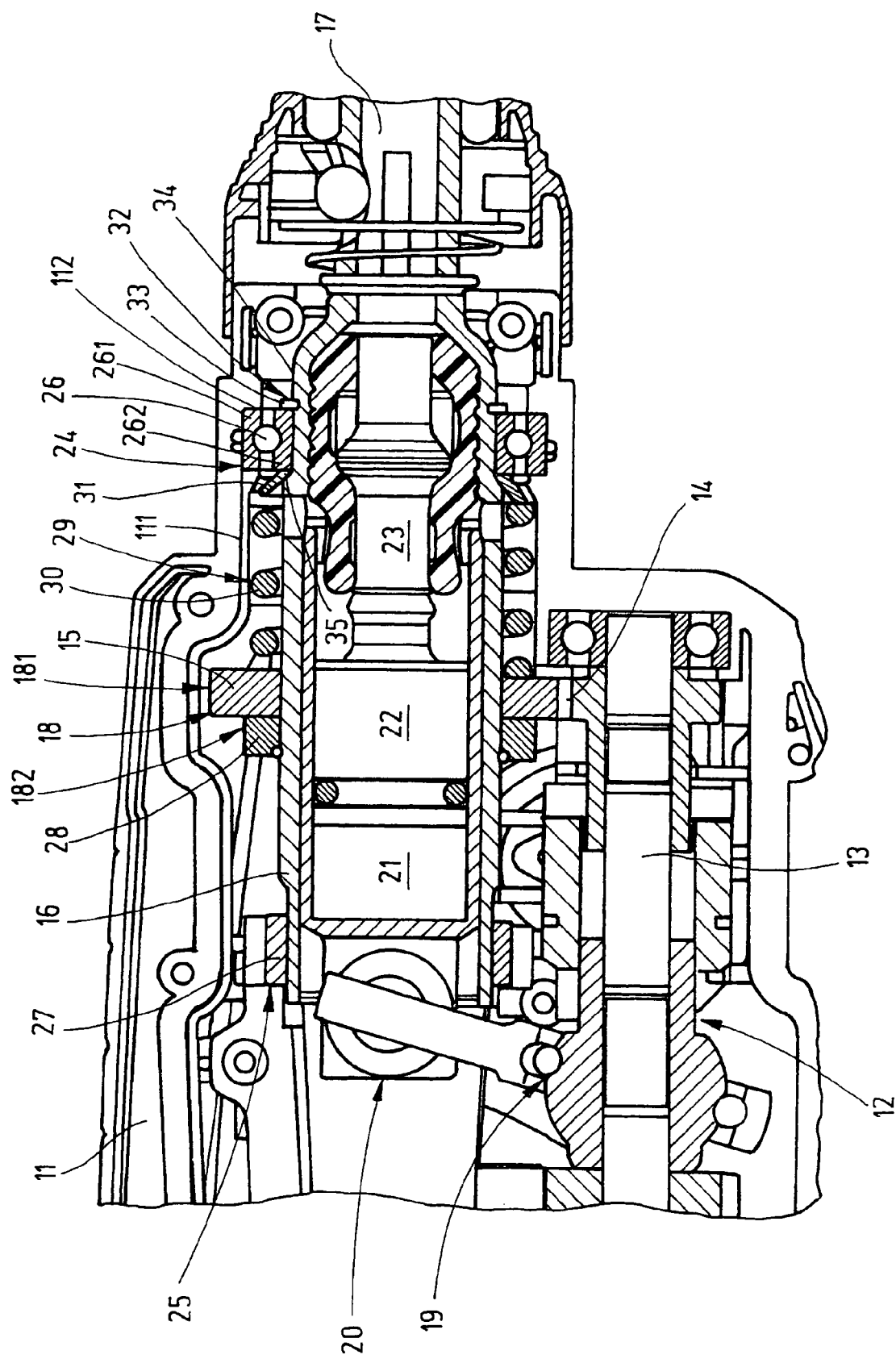

PORTABLE POWER TOOL, IN PARTICULAR A DRILLING HAMMER AND/OR IMPACT HAMMER

CROSS-REFERENCE

The invention described and claimed hereinbelow is also described in DE 10 2004 0444499.4, filed Sep. 15, 2004. This German Patent Application, whose subject matter is incorporated here by reference, provides the basis for a claim of priority of invention under 35 U.S.C. 119 (a)-(d).

BACKGROUND OF THE INVENTION

The present invention relates to a portable power tool, in particular a drilling hammer and/or impact hammer.

A known rotary hammer (EP 1 157 788 A2) has a rotating sleeve referred to as a hammer tube that is connected with a tool holder in a rotation-proof manner. The hammer tube bearing arrangement in the housing is designed as a radial needle bearing located in the anterior region of the hammer tube that accommodates the tool holder, in a pot-shaped sleeve mounted on the housing. A driving gear-wheel designed as a spur gear and seated loosely on the hammer tube is connected with the hammer tube in a rotation-proof manner via a safety clutch and is driven by a pinion mounted on a driven shaft of a gearbox. The driving gear-wheel is also a clutch member of the safety clutch, the other clutch member being a driving ring. The driving ring is provided with teeth on its inner ring surface, these teeth meshing with outer teeth formed on a section of the hammer tube.

The two clutch members are held in engagement with each other by a coupling spring that is designed as a coil compression spring, is mounted on the hammer tube, and bears against a support shoulder formed on the hammer tube and against the driving gear-wheel. When a limit torque is exceeded—which occurs, e.g., when a tool becomes stuck in the work piece being machined—the two clutch members slip against the force of the coupling spring, and the driving gear-wheel can rotate relative to the hammer tube.

SUMMARY OF THE INVENTION

Accordingly, it is an object of the present invention to provide a rotatable power tool, in particular a drilling hammer and/or impact hammer, which is a further improvement of the existing portable power tools.

In keeping with these objects and with others which will become apparent herein after, resides, briefly stated in a portable power tool, comprising a housing; a rotating sleeve provided for rotatably driving a tool and a rotatably supported in said housing by at least one bearing; a driving gear-wheel installed on said rotating sleeve in a freely rotating manner and drivable by a motor; a safety clutch that couples said driving gear-wheel with said rotating sleeve in a rotation-proof manner, said safety clutch having two clutch members that are slippable, one of said clutch members being assigned to said driving gear-wheel and the other clutch member is assigned to said rotating sleeve in both cases in a rotation-proof manner, a coupling sleeve providing a force against which said clutch members are slippable when a limit torque is exceeded, said bearing being seated on said rotating sleeve in an axially displaceable manner and loaded by said coupling sleeve of said safety clutch against an axial stop of said rotating sleeve.

When the portable power tool is designed according to the present invention, it has the advantage that the bearing for the rotating sleeve is integrated in the "safety clutch" unit, which simplifies assembly of the portable power tool. No special components are required to secure the bearing against axial displacement in the housing, since the axial stops on the rotating sleeve against which the safety clutch bears axially are used simultaneously to secure the bearing, thereby resulting in a bearing seat with absence of axial play. The elimination of the separate components results in cost savings and an axially more compact design of the portable power tool.

According to an advantageous embodiment of the present invention, the coupling spring is designed as a coil compression spring slid onto the rotating sleeve, that bears against a clutch member at one end and, at the other end, against a spring plate that abuts a bearing. The spring plate, which is preferably configured as a conic sheet-metal sleeve, functions as a centrifugal disk and improves the grease seal of the bearing.

According to an advantageous embodiment of the present invention, the spring plate is located between the bearing and a radial shoulder located on the rotating sleeve, against which the spring plate can bear. This radial shoulder prevents overextension of the coil compression spring.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of drawing is a view showing part of a longitudinal cross section of a portable power tool in accordance with the present invention.

DESCRIPTION OF THE PREFERRED EMBODIMENTS

The exemplary embodiment of a portable power tool shown in part as a longitudinal cross section is designed as a drilling hammer and/or impact hammer. The machine has a housing 11 that contains a drive motor that is electric in particular and is not shown here, and acts via a gearbox 12 on a downstream drilling and/or percussion mechanism. To this end, gearbox 12 has a driven shaft 13 with a pinion 14 mounted on it in a rotation-proof manner that meshes with a driving gear-wheel 15 designed as a spur gear.

Driving gear-wheel 15 sits loosely on a rotating sleeve 16—also referred to as a hammer tube—that is rotatably supported in housing 11, the rotating sleeve supporting a tool receptacle 17 at one end for the replaceable insertion of a hammering and/or drilling tool. Driving gear-wheel 15 is coupled via a safety clutch 18 with rotating sleeve 16 to drive it in a rotating manner. In addition, a percussion mechanism 20 is driven in a translatory manner by driven shaft 13 of gearbox 12 via a wobble plate drive arrangement 19.

Percussion mechanism 20 located in rotating sleeve 16 includes, in a known manner, a piston 21 driven to-and-fro by wobble plate drive arrangement 19 and a ram or striking pin 22 located at a distance from said piston, and a beatpiece 23 located downstream of striking pin 22 in rotating sleeve 16, the beatpiece acting indirectly on the tool retained in tool receptacle 17 in an axially displaceable manner. Piston 21, striking pin 22 and beatpiece 23 are guided in rotating sleeve 16 in an axially displaceable manner.

The rotatable support of rotating sleeve 16 in housing 11 is accomplished using two bearings 24, 25 that are separated axially. Bearing 24 located in the anterior region of rotating sleeve 16 is designed as roller bearing 26 with bearing outer ring 261 and bearing inner ring 262. Bearing 25 located in the rear region of rotating sleeve 16 is designed as a plain bearing.

Safety clutch 18 includes, in a known manner, two concentric clutch members 181, 182 that are meshed via torque-transferring elements, the clutch members being able to slip against an axially acting force when a predetermined limit torque is exceeded. One clutch member 181 is designed as an integral part of driving gear-wheel 15, and the other clutch member 182 is a driving ring 28 formed on rotating sleeve 16 in a rotation-proof manner. Although not shown in further detail, the rotation-proof connection between driving ring 28 and driving gear-wheel 15 is established via meshed, axial teeth on driving ring 28 and driving gear-wheel 15.

The transfer elements of the clutch members are usually toothed arresters formed on the front sides of driving gear-wheel 15 and driving ring 28 that face each other and are meshed in a torque-transferring manner. The axial force that establishes the limit torque is applied by a coupling spring 29 designed as a coil compression spring 30 slid onto rotating sleeve 16. Coil compression spring 30 bears against driving gear-wheel 15 on one side and, on the other, against a spring plate 31 slid onto rotating sleeve 16, that is configured as a conic sheet-metal sleeve. Spring plate 31 bears against bearing inner ring 262 under the spring force of coil compression spring 30.

On the front side facing away from spring plate 31, bearing inner ring 262 bears against an axial stop 32 formed in rotating sleeve 16, so that bearing inner ring 262—mounted on rotating sleeve 16 in a slideable manner—is loaded and fixed in position by coupling spring 29 on rotating sleeve 16 with absence of axial play. Axial stop 32 is formed by a retaining ring 33 situated in an annular groove 34 formed in rotating sleeve 16. Bearing outer ring 261, which bears radially against inner wall of housing 11, is pressed against a circumferential housing shoulder 112 when bearing inner ring 262 is loaded.

When the safety clutch is assembled, detent ring 28, driving gear-wheel 15, coil compression spring 30 and spring plate 31 are slid—together with roller bearing 26—onto rotating sleeve 16, preloaded, and fixed in position axially using retaining ring 33, which is inserted into annular groove 34. Coil compression spring 30 is prevented from over-extending via a stop shoulder 35 formed on rotating sleeve 16, the stop shoulder facing bearing inner ring 262 and bearing against spring plate 31.

It will be understood that each of the elements described above, or two or more together, may also find a useful application in other types of constructions differing from the types described above.

While the invention has been illustrated and described as embodied in a portable power tool, in particular a drilling hammer and/or impact hammer, it is not intended to be limited to the details shown, since various modifications and structural changes may be made without departing in any way from the spirit of the present invention.

Without further analysis, the foregoing will reveal fully revel the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims.

What is claimed is:

1. A portable power tool, comprising:
    a housing;
    a rotating sleeve provided for rotatably driving a tool and rotatably supported in said housing by at least one bearing;
    a driving gear-wheel installed on said rotating sleeve in a freely rotating manner and drivable by a motor;
    a safety clutch that couples said driving gear-wheel with said rotating sleeve in a torque-transmitting manner, wherein said safety clutch has two clutch members that are slippable, with one of said clutch members being assigned to said driving gear-wheel in a torque-transmitting manner and the other clutch member being assigned to said rotating sleeve in a torque transmitting manner, and with a coupling spring providing a force against which said clutch members can be overlatched when a limit torque is exceeded, said bearing being seated on said rotating sleeve in an axially displaceable manner and said bearing being braced against an axial stop on said rotating sleeve by said coupling spring of said safety clutch,
    further comprising a spring plate, said coupling spring being configured as a coil compression spring slid onto said rotating sleeve, said coil compression spring bearing against one of said clutch members with one end and against an outer diameter of one abutting surface of said spring plate at the other end;
    further comprising a contact shoulder on said rotating sleeve, said spring plate being located between said bearing and said contact shoulder of said rotating sleeve, wherein said bearing is configured as a roller bearing with a bearing outer ring that bears radially against said housing and a bearing inner ring seated on said rotating sleeve in a sliding manner, said bearing inner ring being loaded by said compression spring and an inner diameter of another abutting face of said spring plate against said axial stop of said rotating sleeve, and wherein said rotating sleeve has an annular groove, said axial stop of said rotating sleeve being formed by a retaining ring which is situated in said annular groove of said rotating sleeve.

2. A portable power tool as defined in claim 1, wherein said clutch members have toothed arresters which are meshed on their front sides, said clutch member which is assigned to said driving gear-wheel being configured as an integral part of said driving gear-wheel, while said clutch member which is assigned to said rotating sleeve being configured as a driving ring mounted on said rotating sleeve in a rotation-proof manner.

3. A portable power tool as defined in claim 1, wherein the portable tool is configured as a tool selected from the group consisting of a drilling hammer, an impact hammer, and both.

* * * * *